July 23, 1963  TOMISUKE URABE  3,098,422
CAMERA DIAPHRAGM
Filed Sept. 1, 1960
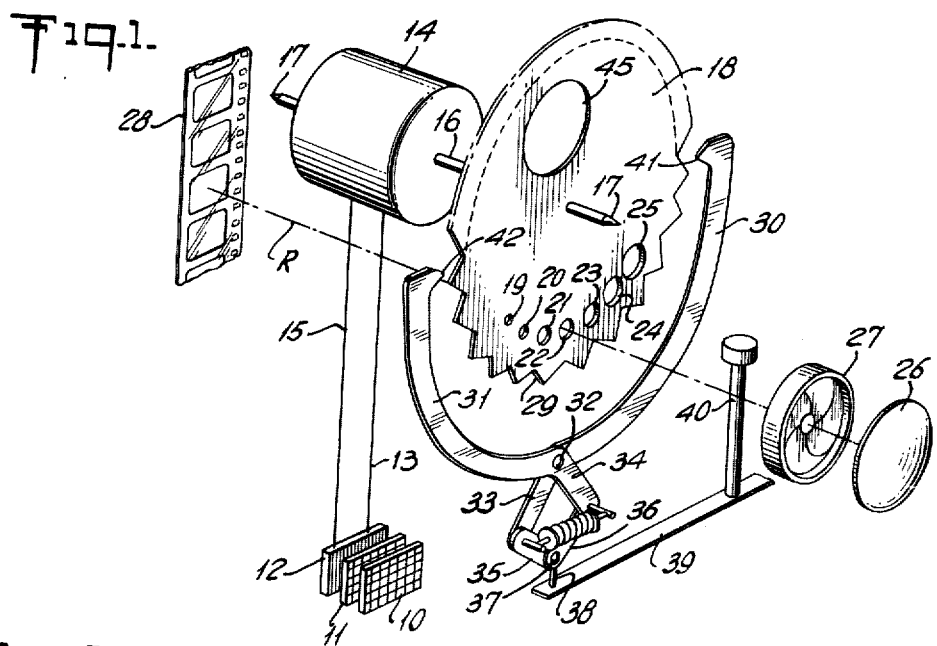
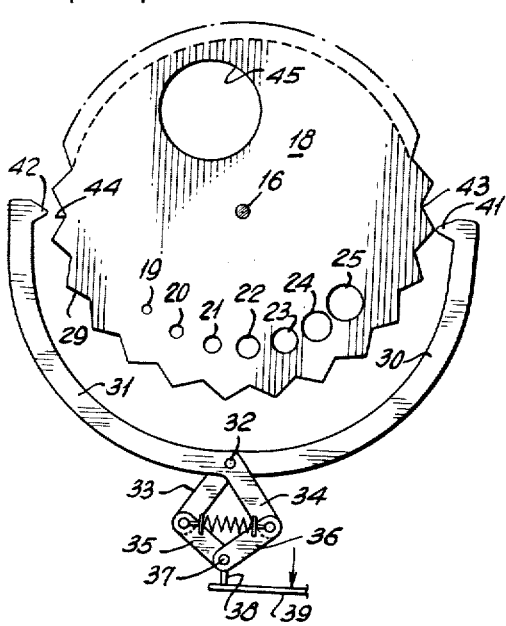
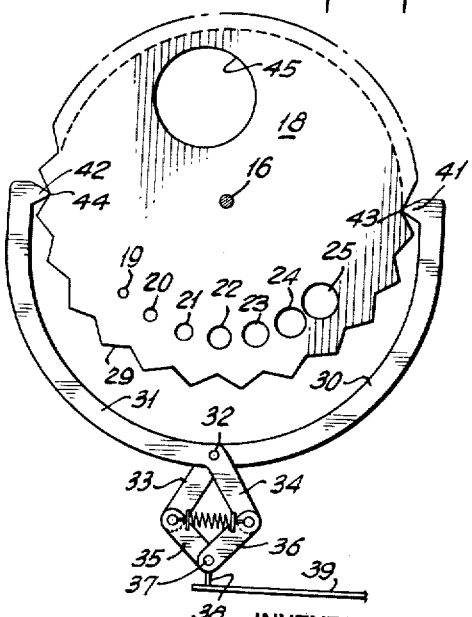
INVENTOR
TOMISUKE URABE
BY
Burgess, Ryan & Hicks
ATTORNEYS 3,098,422
CAMERA DIAPHRAGM
Tomisuke Urabe, % Sankyo Seiki Mfg. Co., Ltd.,
3836 Ooaza Kamisuwa, Suwa-shi, Negano Pref., Japan
Filed Sept. 1, 1960, Ser. No. 53,554
Claims priority, application Japan Mar. 23, 1960
3 Claims. (Cl. 95—64)

This invention relates to an automatic camera diaphragm in which a photocell measures the illumination of a subject and regulates the size of the diaphragm opening by means of a galvanometer.

An object of the invention is reduction of friction in the diaphragm to a minimum so that weak currents from the photocell may activate the diaphragm.

A further object is the provision of round diaphragm openings.

Another object is prevention of movement of the diaphragm opening during the time when the shutter is open.

Further objects of the invention will be apparent from the following description, in which—

FIG. 1 is an exploded view in perspective of various parts of an automatic diaphragm embodying the present invention;

FIG. 2 is a view of the diaphragm blade and index means in a disengaged position as seen from the front of the camera; and FIG. 3 is a view of the diaphragm blade and index means in an engaged position as seen from the front of the camera.

FIG. 1 shows a diaphragm mechanism in which a reticular lens 10 and a grid 11 focus light from a subject being photographed on photocell 12. The photocell produces a current varying in magnitude with the intensity of the illumination of the subject. This current flows through wire 13 to the rotor of galvanometer 14 and back to the photocell through wire 15. The spring-loaded galvanometer shaft 16 turns under the influence of the current in bearings (not shown) which carry its conical ends 17, 17. As the current increases, the shaft rotates counterclockwise as seen in FIG. 2.

Rigidly mounted on the galvanometer shaft is a disk-shaped diaphragm blade 18. A series of circular diaphragm openings 19, 20, 21, 22, 23, 24, 25 of graduated area pierce the diaphragm blade with their centers equidistant from the galvanometer shaft. A balance hole 45 is located on the opposite side of the blade to insure that its center of gravity coincides with the galvanometer shaft.

In FIG. 1 a light ray R is shown proceeding along a light path from a subject (not shown) through lens 26, shutter 27, and diaphragm opening 22 to film 28, where an image is formed. The size of diaphragm opening 22 and the speed of the shutter regulate the extent to which the film is exposed in the usual way.

For proper operation it is necessary that one of the diaphragm openings be centered between the lens and the film. The galvanometer alone will not produce such centering, since the current and, therefore, the angular position of the galvanometer shaft varies continuously. In order to center the diaphragm openings, indexing means are provided. These comprise serrations 29 in the edge of the disk and lever arms 30, 31. The lever arms rotate about pivot 32, which is fixed with respect to the body of the camera. A lazy tongs linkage is provided comprised of extension 33 of lever 30, extension 34 of lever 31, intermediate link 35 pivotally attached to extension 33 and intermediate link 36 pivotally attached to extension 34. The extension links are pivoted to each other by rivet 37. Rivet 37 is attached to post 38 which is integral with cantilever spring 39, the other end of which is fastened to the camera body. A shutter release button 40 is shown bearing down on cantilever spring 39. Depression of button 40 opens the shutter through well known linkage means which have been omitted in the interest of clarity. A spring extends between the ends of extension 33 and 34, forcing them apart except when the button is depressed.

The operation of the device is as follows: When it is desired to take a picture the photocell is exposed to light from the subject. The resulting current in the galvanometer movement causes the galvanometer shaft to turn against the resistance of the galvanometer spring until an equilibrium position is reached in which the electromagnetic force due to the current is balanced by the spring force. The equilibrium position depends on the magnitude of the current and, therefore, the intensity of the light from the subject. Consequently, the size of the diaphragm openings may be calculated so that for any given light intensity a suitable opening is adjacent the light path from lens to film.

When the shutter button is depressed rivet 37 travels downward as the cantilever spring flexes and the levers 30 and 31 move from the disengaged position of FIG. 2 to the engaged position of FIG. 3. If the suitable diaphragm opening is not centered in the light path, indexing edges 41, 42 on the levers contact the sides of the serrations and rotate the diaphragm blade slightly until it is so centered. The engaged position of FIG. 3 is thus attained in which the index edges contact detents 43, 44, at the depressed or most inwardly extending part of the serrations.

It is important that the smallest possible force be exerted on the galvanometer bearings and parts and this result is obtained by the use of cantilever spring 39, which is flexible enough to absorb any over-travel of the shutter release knob which may occur due to machining inaccuracy. In addition, the forces exerted by the levers against the diaphragm disk balance each other, since they are applied at opposite ends of a diameter. Since no bearings besides those in use on the galvanometer shaft are required, a low friction automatic diaphram results.

The following is claimed:

1. In a camera having a light path between a lens and a photosensitive surface and a shutter in the light path, an automatic diaphragm comprising a diaphragm blade rotatable about an axis of rotation, a plurality of diaphragm openings in the diaphragm blade of diverse areas, said diaphragm openings lying on an imaginary circle intersecting the light path and having a center coinciding with the axis of rotation, an indexing member movable along an indexing path from a disengaged position in which the indexing member is free from contact with the diaphragm blade to an engaged position, a plurality of detents on the diaphragm blade, each detent associated with a particular diaphragm opening and so located that when a particular diaphragm opening is centered in the light path the detent associated therewith abuts the indexing member when said member is in the engaged position, guide surfaces associated with each detent, the guide surfaces associated with any one detent subtending a limited entrapment angle as viewed from the axis of rotation and the entrapment angles of different guide surfaces being free of overlap, said guide surfaces when placed across the index path centering the detent with which they are associated in the index path by rotating the diaphragm blade in response to pressure from the index member as said member advances to the engaged position, and means sensitive to the degree of illumination of a camera subject adapted to rotate the diaphragm disk while the indexing member is in the disengaged position to place those guide surfaces across the index path which are associated with a diaphragm opening of suitable area properly to regulate the light intensity reaching the photosensitive surface, and means associated with the shutter to move the indexing member into the engaged position and thereby orient a diaphragm opening in the light path while the shutter is open and to move the indexing member into the disengaged position the shutter is closed, thereby allowing rotation of the diaphragm disk by the means sensitive to the degree of illumination of the camera subject.

2. In a camera having a light path between a lens and a photosensitive surface and a shutter in the light path, an automatic diaphragm comprising a rotatable disk-shaped diaphragm blade having a central axis of rotation, a plurality of substantial circular openings in the diaphragm blade of diverse areas, the centers of said openings being located on an imaginary circle intersecting the light path and having a center coinciding with the axis of rotation, said openings being so located that rotation of the diaphragm blade in a first direction successively introduces openings of larger area into the light path, two pivoted index members each having an indexing edge remote from the pivot, and movable along an index path as the index member pivots from a disengaged position in which the index member is free from contact with the diaphragm blade to an engaged position, the indexing edges lying on opposite sides of the axis of rotation, serrations on the edge of the diaphragm blade having depressed portions, said serrations being successively introduced across the index paths as the diaphragm blade rotates and so located that the depressed portion of serrations on opposite sides of the axis of rotation cross the index paths at the same time and that when the depressed portion of a serration is in an index a diaphragm opening is in the light path, a shutter release, connecting means between the shutter release and the indexing members adapted to move them into the engaged position when the shutter release is operated, said movement causing the indexing edge of each index member to enter a serration and finally abut a depressed portion when the engaged position is reached, and said connecting means adapted to move the indexing members into the disengaged position prior to the operation of the shutter, thereby allowing rotation of the diaphragm disk by a galvanometer, a photocell measuring the illumination of a subject and producing a current, a galvanometer movement responsive to the current and positioning the diaphragm disk while the indexing member is in the disengaged position in response thereto so that the serrations corresponding to the diaphragm opening which will properly expose the photosensitive surface lie in the indexing path of the index edges.

3. An automatic diaphragm comprising a rotatable diaphragm blade, a plurality of diaphragm openings arcuately distributed on the diaphragm blade and successively movable into a light path upon rotation of the diaphragm blade, means for rotating the diaphragm blade to bring a desired diaphragm opening into the vicinity of the light path, means for centering the diaphragm opening in the light path upon release of a shutter, the latter means comprising a pair of indexing edges movable toward the axis of rotation on opposite sides thereof and engageable with serrations being so formed that with the index edges fully engaged with serrations the center of a diaphragm opening is in the light path, and each index edge being formed on a lever, the two levers having a common pivot, and means connected with a shutter release for moving them together about the pivot in causing the index edges to engage the serrations.

References Cited in the file of this patent

UNITED STATES PATENTS

| | | |
|---|---|---|
| 2,058,562 | Bucky | Oct. 27, 1936 |
| 2,369,473 | Luboshez | Feb. 13, 1945 |
| 2,393,407 | Peterson | Jan. 22, 1946 |
| 2,913,969 | Faulhaber | Nov. 24, 1959 |
| 2,961,936 | Renger et al. | Nov. 29, 1960 |

FOREIGN PATENTS

| | | |
|---|---|---|
| 216,966 | Switzerland | Jan. 16, 1942 |

UNITED STATES PATENT OFFICE
CERTIFICATE OF CORRECTION

Patent No. 3,098,422　　　　　　　　　　　　　　　July 23, 1963

Tomisuke Urabe

It is hereby certified that error appears in the above numbered patent requiring correction and that the said Letters Patent should read as corrected below.

Column 3, line 28, after "index" insert -- path --.

Signed and sealed this 14th day of January 1964.

(SEAL)
Attest:
ERNEST W. SWIDER

Attesting Officer

EDWIN L. REYNOLDS

Acting Commissioner of Patents